(12) United States Patent
Ogino et al.

(10) Patent No.: US 8,966,364 B2
(45) Date of Patent: Feb. 24, 2015

(54) IMAGE EDITING APPARATUS ALLOWING EASY EDITION OF PAGE ARRANGEMENT ORDER ON A SCROLLABLE PREVIEW DISPLAY OF PAGE IMAGES

(75) Inventors: Kumiko Ogino, Osaka (JP); Shinsaku Tohki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 72 days.

(21) Appl. No.: 13/242,872

(22) Filed: Sep. 23, 2011

(65) Prior Publication Data

US 2012/0079375 A1    Mar. 29, 2012

(30) Foreign Application Priority Data

Sep. 28, 2010 (JP) .................................. 2010-216586

(51) Int. Cl.
*G06F 17/00* (2006.01)
*G06F 17/24* (2006.01)
*G06F 3/00* (2006.01)
*G06T 11/60* (2006.01)
*H04N 1/00* (2006.01)

(52) U.S. Cl.
CPC ............ *G06T 11/60* (2013.01); *H04N 1/00448* (2013.01); *H04N 1/00458* (2013.01); *H04N 2201/0094* (2013.01); *H04N 2201/3288* (2013.01)
USPC ............ 715/274; 715/273; 715/731; 715/786

(58) Field of Classification Search
CPC .................... G06F 17/30126; G06F 17/30011; G06F 3/0485; G06T 11/60; G06T 2200/24
USPC .......................................... 715/274, 774, 786
See application file for complete search history.

(56) References Cited

U.S. PATENT DOCUMENTS

| | | | |
|---|---|---|---|
| 7,797,641 B2 * | 9/2010 | Karukka et al. .............. | 715/802 |
| 8,423,890 B2 * | 4/2013 | Oda .............................. | 715/273 |
| 2004/0150671 A1 * | 8/2004 | Kamiwada et al. ........... | 345/782 |
| 2008/0155458 A1 * | 6/2008 | Fagans et al. ................. | 715/781 |
| 2008/0231914 A1 * | 9/2008 | Motoyoshi .................. | 358/1.16 |
| 2008/0301583 A1 | 12/2008 | Akagi | |
| 2010/0085318 A1 * | 4/2010 | Lee et al. ...................... | 345/173 |
| 2012/0050788 A1 * | 3/2012 | Bachman et al. ............ | 358/1.15 |

FOREIGN PATENT DOCUMENTS

| | | |
|---|---|---|
| JP | 2004-282439 A | 10/2004 |
| JP | 2008-269083 A | 11/2008 |
| JP | 2008-301255 A | 12/2008 |
| JP | 2010-171780 A | 8/2010 |

* cited by examiner

*Primary Examiner* — Adam M Queler
*Assistant Examiner* — Ariel Mercado
(74) *Attorney, Agent, or Firm* — Edwards Wildman Palmer LLP; David G. Conlin; Steven M. Jensen

(57) ABSTRACT

An image editing apparatus allowing easy edition of page arrangement order on the preview display of page images includes a display device having a display screen and a preview display device configured to display image data in a scrollable manner. If any page is selected from the images of preview display, the selected page is displayed as a reduced image at a position different from the preview images. By drag-and-dropping the reduced image to an arrangement of preview images, the selected page moves to the drag-and-dropped position in the image data.

11 Claims, 14 Drawing Sheets

IMAGE EDITING APPARATUS ALLOWING EASY EDITION OF PAGE ARRANGEMENT ORDER ON A SCROLLABLE PREVIEW DISPLAY OF PAGE IMAGES

CROSS REFERENCE TO RELATED APPLICATION

This nonprovisional application claims priority under 35 U.S.C. §119(a) on Patent Application No. 2010-216580 filed in Japan on Sep. 28, 2010, the entire contents of which are hereby incorporated by reference.

BACKGROUND OF THE INVENTION

1. Field of the Invention

The present invention relates to an image editing apparatus and, more specifically, to an image editing apparatus allowing edition of image data using preview display.

2. Description of the Background Art

Recently, multifunctional peripherals as one type of image editing apparatus are introduced to many places of business (companies and offices). A multifunctional peripheral has a plurality of basic operational modes such as a copy mode, a facsimile mode, a network-supported printer mode and a scanner mode. Such a multifunctional peripheral is often provided with a touch-panel display. It is possible for a user to confirm and edit image data on the display. The user can operate the touch panel while viewing displayed screen images. The multifunctional peripheral additionally has various functions such as storage of image data and preview display. It is often the case that the user also uses the operation panel to give instructions related to these functions. Therefore, an interface screen image of the image editing apparatus comes to play more important role.

For confirming and editing image data, preview display is frequently used. By the preview display, the user can easily confirm how the image data will be output. By a preview display including a plurality of image data, the user can easily confirm the page order of image data.

An example of preview display function is disclosed in Japanese Patent Laying-Open No. 2010-171780. According to this technique, a preview display of a read image is given, and thumb-nail display is given for images that have been read. By this technique, the order of image data can readily be confirmed by the thumbnail display. When any of the thumb-nail images is selected after reading is completed, preview image of the selected image is given.

SUMMARY OF THE INVENTION

When one wishes to change the order of page images while viewing the preview display, a commonly used method is as follows. One selects the page image to be moved, drags the image, and drops the image at a desired position. Background image is scrolled as needed. By such a process, the order of page images can easily be changed.

The above-described process, however, has a problem that the amount of scrolling increases and operation becomes troublesome if the number of page images is large. If the operation is to be made using the thumbnail display as disclosed in Japanese Patent Laying Open No. 2010-171780, it is difficult to confirm contents of each page image and, therefore, the operation is still troublesome. Further, the process described above has a problem that a plurality of pages positioned away from each other cannot be selected at once to be moved to the same position.

Therefore, it is desirable that, in an image editing apparatus providing preview display of page images, page order can easily be edited.

It is more desirable that, in an image editing apparatus providing preview display of page images, positions of a plurality of pages at arbitrary positions can easily be changed.

According to a first aspect, the present invention provides an image editing apparatus, including: a display device having a display screen; a storage configured to store image data of a plurality of pages; a preview display device configured to display preview images of the image data stored in the storage in a scrollable manner on the display screen; a page selecting device configured to select any page of the image data in response to a user operation; a selected page display device, configured to display an image representing a page selected by the page selecting device on the display screen, separate from the preview image displayed by the preview display device and independent from scrolling by the preview display device; and an editing device configured to edit page order of the image data in response to a user operation on the image displayed by the selected page display device.

The image representing the selected page is displayed separately and independently from the preview display, by the selected page display device. Therefore, even when the preview display is scrolled, the image is kept displayed. The user can easily confirm which page has been selected while scrolling the preview display. When a user instruction is given to the image, the page order of image data is changed by the editing apparatus. The user can change the page order while confirming the image of selected page. As a result, in the image editing apparatus providing preview display of page images, the page order can easily be edited. The image displayed by the selected page display device may be the preview image of reduced size, or it may be a text image, or a numeral indicating the page number.

Preferably, the image displayed by the selected page display device is the image of the page selected by the page selecting device, and smaller than the image of the page displayed by the preview display device.

Since the image is displayed as the image of selected page in a smaller size than the preview display, the user can recognize at one sight which page is the selected page. Since the image is smaller than the preview image, it does not interfere with the preview display, and the image can be displayed even on an image editing apparatus having a small display panel.

Preferably, the image editing apparatus includes a moving apparatus configured to move, in response to a user operation of dragging the image displayed by the selected page display device to an arrangement of preview images displayed by the preview display device, a page corresponding to the image in the image data.

When the image is dragged to the preview image, the drag operation is reflected on the image data and the order of pages of image data is changed. Since the user can change the page order by directly moving the image itself, the operation is simple and clear.

More preferably, the preview display device further displays a button instructing deletion of the image data on the display screen. The editing apparatus further includes a deleting device, configured to delete, in response to a user operation of drag-and-dropping the image displayed by the selected page display device to the button displayed by the preview display device, a page corresponding to the image from the image data.

Page deletion can also be realized by dragging the image, similar to the change of page order. Therefore, the operation for deleting a page is very simple to understand.

Preferably, the image editing apparatus in accordance with the present invention further includes an inserting device, configured to move and insert, in response to a user operation of selecting the preview image displayed by the preview display device and drag-and-dropping the preview image on the display screen, the page selected and drag-and-dropped by the user to a position corresponding to the drag-and-dropped position in the arrangement of the image data of a plurality of pages.

The page order of image data can also be changed by the operation of drag-and-dropping the preview image. Therefore, the user can change the page order of image data by operating either the preview image or the image displayed by the selected page display device.

Preferably, the image editing apparatus in accordance with the present invention further includes a selection cancelling, device configured to cancel selection of the page selected by the page selecting device, in response to a user operation; and an erasing device configured to erase, in response to cancellation by the selection cancelling device, that image among the images displayed by the selected page display device which corresponds to the page of which selection is cancelled by the selection cancelling device.

When selection of an image is cancelled, the image is erased. Therefore, only the images in the selected state are displayed and, the user can easily confirm, as needed, which page or pages are selected.

According to a second aspect, the present invention provides, in an image editing apparatus including a display device having a display screen, a storage configured to store image data of a plurality of pages, and a preview display device configured to display preview images of the image data stored in the storage in a scrollable manner on the display screen, an image editing method of editing order of the image data, including the steps of: selecting, in response to a user operation, any page of the image data; displaying, in response to selection of any page at the selecting step, an image representing the page selected at the page selecting step, separate from the preview image displayed by the preview display device and independent from scrolling by the preview display device, on the display screen; and editing, in response to a user operation on the image displayed on the display screen, order of pages of the image data.

According to a third aspect, the present invention provides a non-transitory, computer readable recording medium recording a computer program for operating a computer connected to a display device having a display screen and to a storage configured to store image data of a plurality of pages, the program causing, when executed by the computer, the computer to execute the following image editing method. Specifically, the image editing method includes the steps of: displaying a preview image of image data stored in the storage on the display screen; scrolling, in response to a prescribed scrolling instruction by a user on the preview image displayed on the display screen, the preview image in a direction designated by the scroll instruction; selecting, in response to a user operation, any page of the image data; displaying, in response to selection of any page at the selecting step, an image representing the page selected at the page selecting step, separate from the preview image displayed at the step of displaying a preview image, on the display screen; and editing order of pages of the image data, in response to a user operation on the images displayed on the display screen. The scrolling step includes the step of scrolling, in response to a prescribed scroll instruction by the user on the preview image displayed on the display screen, the preview image in a direction designated by the scroll instruction, without changing display position of the image representing the selected page.

According to the present invention, the page image selected by the user is displayed on an area different from the preview display. Even when the preview display changes, the display of page image is maintained, and it is also possible to edit the image data using the page image. Therefore, it is possible for the user to edit image data while confirming the display of page image.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
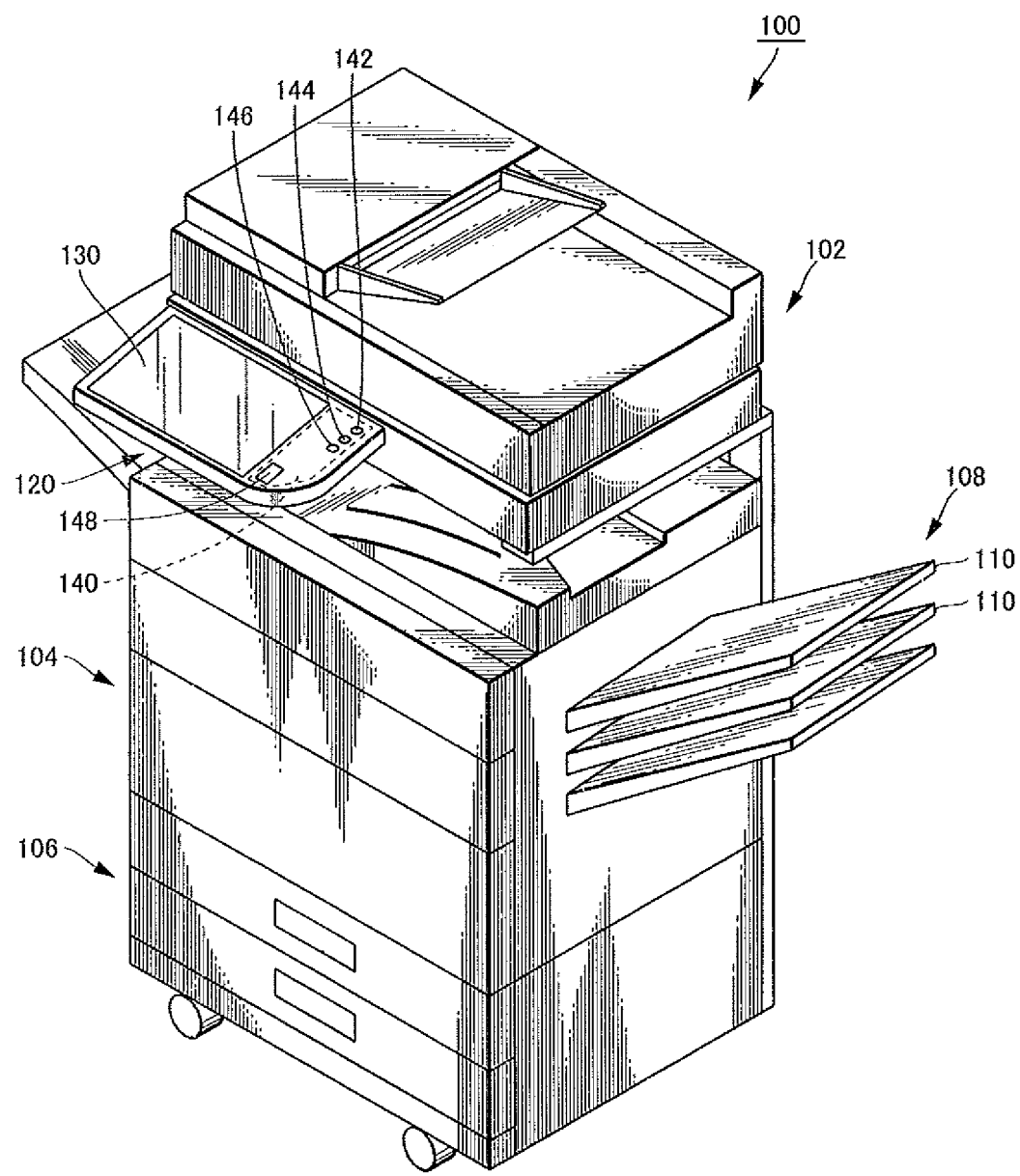
FIG. 1 is a perspective view showing an appearance of the image editing apparatus in accordance with an embodiment of the present invention.

In the following description, the same components are denoted by the same reference characters. Their names and functions are also the same. Therefore, detailed description thereof will not be repeated.

The image editing apparatus in accordance with the present invention will be described with reference to an image forming apparatus as an example. The present invention, however, is not limited to such an embodiment. The present invention is applicable to an image editing apparatus other than such an image forming apparatus. The image editing apparatus may be any apparatus that reads a document, provides preview display of document images, and allows page-by-page edition of the images.

It is assumed that the image editing apparatus in accordance with the present embodiment includes a touch-panel display that can be operated by gesture operations as well as touch operations other than the gesture operations. The present invention, however, is not limited to such an embodiment. The image editing apparatus may include a touch-panel display allowing touch operations only.

The image editing apparatus forms an image on a sheet of recording paper by electro-photography. The image editing apparatus includes, as operational modes, copy mode, mail mode, FAX mode, i-FAX mode (facsimile transmission through the Internet), shared folder mode, data input mode, FTP (File Transfer Protocol) mode and desk top mode. In the following, configuration of image editing apparatus 100 will be described referring to the operation in the copy mode as an example.

[Function]

Figure 2:
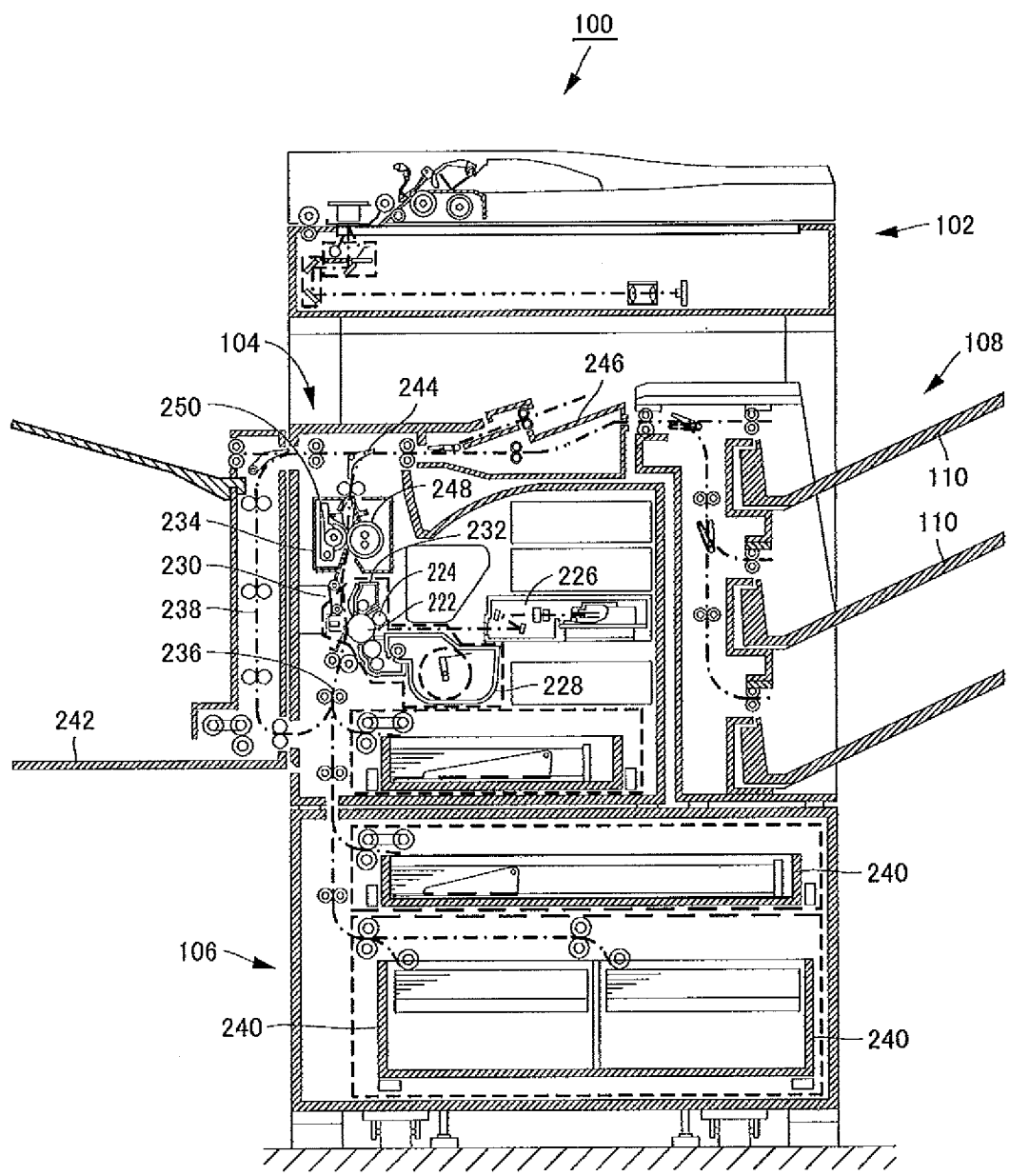
FIG. 2 schematically shows an internal configuration of the image editing apparatus shown in FIG. 1.
Figure 3:
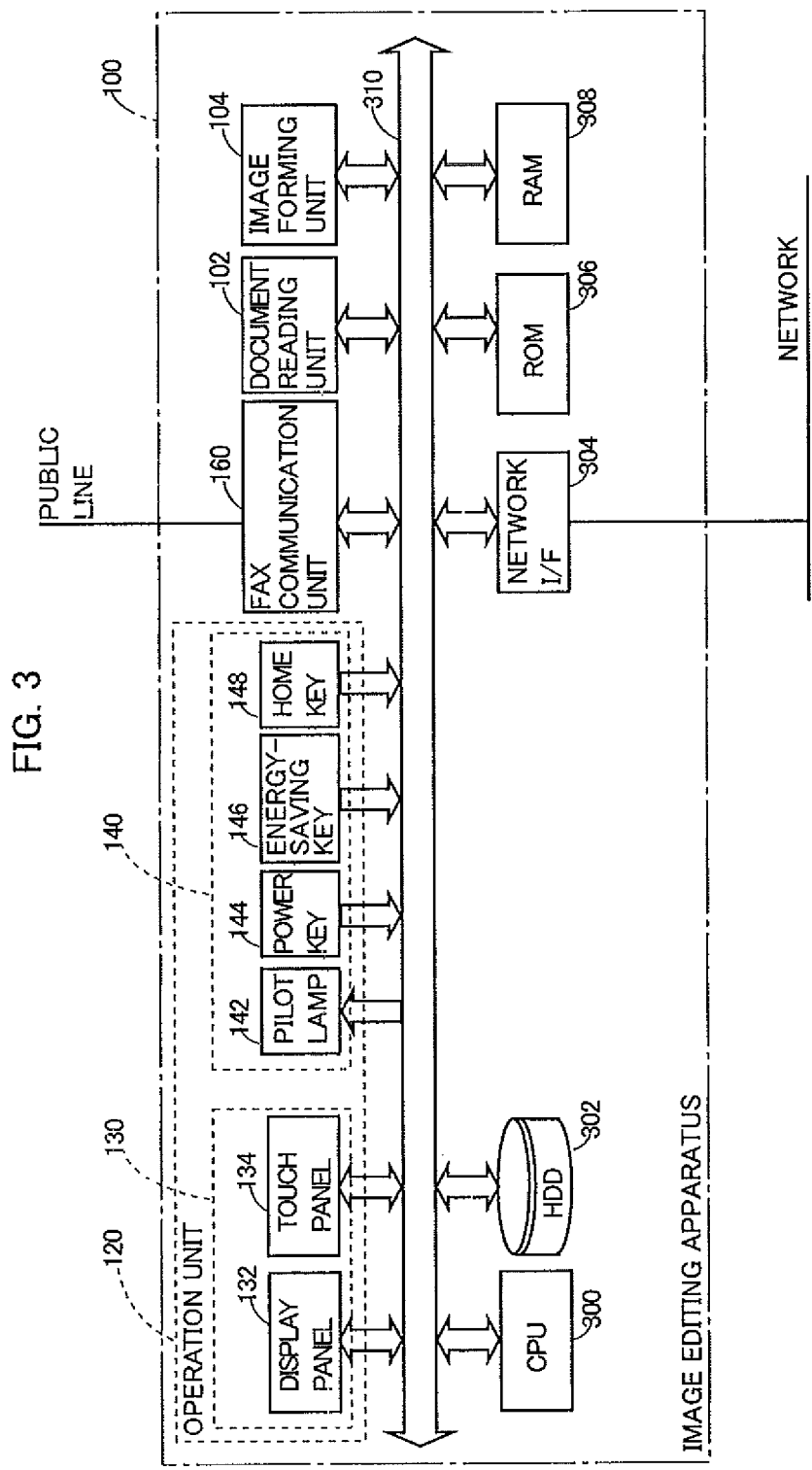
FIG. 3 is a block diagram showing a hardware configuration of the image editing apparatus shown in FIG. 1.

Referring to FIGS. 1 to 3, image editing apparatus 100 includes a document reading unit 102, an image forming unit 104, a paper feed unit 106, a paper discharge unit 108 and an operation unit 120. Operation unit 120 includes a touch-panel display 130 and a display operation unit 140. Touch-panel display 130 includes a display panel 132 formed of a liquid crystal panel or the like, and a touch-panel 134 arranged on display panel 132, which detects a position of a user's finger touching the surface. Display operation unit 140 includes a pilot lamp 142, a power key 144, an energy-saving key 146, and a home key 148 for returning the display screen image of touch-panel display 130 to a home screen image allowing selection of an operational mode.

As described above, image editing apparatus 100 in accordance with the present embodiment is provided with touch-panel display 130 as a main operation device, and, in addition, with display operation unit 140 including hardware keys and a pilot lamp. The keys (power key 144, energy-saving key 146 and home key 148) of display operation unit 140 are hardware buttons, different from the software buttons realized by touch-panel display 130. The operational modes of image editing apparatus 100 as such will be described.

—Copy Mode—

In the following, an operation in the copy mode will be described. In the copy mode, mainly document reading unit (also referred to as a scanner unit) 102 and image forming unit 104 operate.

In image editing apparatus 100, a document placed on a platen is read by document reading unit 102 as image data. The read image data is input to CPU (Central Processing Unit) 300 implemented, for example, by a microcomputer shown in FIG. 3. The image data is subjected to various image processing operations here, and the resulting image data is output to image forming unit 104. In image editing apparatus 100, it is possible to read data once, to provide preview display of the images, to execute various data editions, and thereafter to output the data, rather than to provide a copy output immediately. For this purpose, on touch-panel display 130, a scan start key (not shown in FIGS. 1 to 3) is displayed, in addition to the copy start key. When the copy start key is pressed, the image is output immediately after document reading, to a recording medium (in most cases, sheet of recording paper). When the scan start key is pressed, image data is once stored in the storage, and a preview image is produced and displayed on touch-panel display 130. After the preview image is displayed on touch-panel display 130, various editing processes may be made. The editing processes will be described later. Here, a process in which the image is immediately formed on a sheet of recording paper after reading the document will be described.

Image forming unit 104 is for printing an image of the document represented by the image data on a recording medium. Image forming unit 104 includes a photoreceptor drum 222, a charger 224, a laser scanning unit (hereinafter denoted as LSU) 226, a developer 228, a transfer device 230, a cleaning device 232, a fixing device 234 and a neutralizer, not shown.

In image forming unit 104, a main feeding path 236 and a reverse feeding path 238 are provided, and a sheet of recording paper fed from paper feed unit 106 is fed along main feeding path 236. Paper feed unit 106 draws out sheets of recording paper stacked on a paper feed cassette 240 or on a manual feed tray 242 one by one, and feeds the sheet of paper to main feeding path 236 of image forming unit 104.

While the sheet of recording paper is fed along main feeding path 236 of image forming unit 104, the sheet passes between photoreceptor drum 222 and transfer device 230, and further passes through fixing device 234, whereby printing is done on the sheet of recording paper.

Photoreceptor drum 222 rotates in one direction, and its surface is cleaned by cleaning device 232 and the neutralizer and, thereafter, uniformly charged by charger 224.

LSU 226 modulates the laser beam based on the image data to be printed, and repeatedly scans the surface of photoreceptor drum 222 with the modulated laser beam in a main scanning direction, whereby an electrostatic latent image is formed on the surface of photoreceptor drum 222.

Developer 228 develops the electrostatic latent image by supplying toner to the surface of photoreceptor drum 222, and thus, a toner image is formed on the surface of photoreceptor drum 222.

Transfer device 230 transfers the toner image on the surface of photoreceptor drum 222 to the sheet of recording paper passing between transfer device 230 and the photoreceptor drum 222.

Fixing device 234 includes a heating roller 248 for heating the sheet of recording paper and a pressure roller 250 for pressing the sheet of recording paper. As the sheet of recording paper is heated by heating roller 248 and pressed by pressure roller 250, the toner image that has been transferred to the sheet of recording paper is fixed on the sheet. A heater is heated by electric power supplied to fixing device 234 and controlled such that temperature of heating roller 248 attains to an appropriate temperature for fixing. When operational mode is changed to the energy saving mode, power supply to the heater is, for example, stopped or reduced.

At a position of connection between main feeding path 236 and reverse feeding path 238, a separation pawl 244 is arranged. When printing is done only on one side of the sheet of recording paper, separation pawl 244 is so positioned that the sheet of recording paper fed from fixing device 234 is guided to paper discharge tray 246 or a paper discharge unit 108.

When printing is done on both sides of the sheet of recording paper, separation pawl 244 is turned to a prescribed direction, so that the sheet of recording paper is guided to reverse feeding path 238. The sheet of recording paper passes through reverse feeding path 238, turned upside-down and again fed to main feeding path 236, and while it is again fed along main feeding path 236, printing is done on its rear surface, and thereafter the sheet is guided to paper discharge tray 246 or to paper discharge unit 108.

The sheet of recording paper printed in the above-described manner is guided to paper discharge tray 246 or to paper discharge unit 108, and discharged to paper discharge tray 246 or to any of paper discharge trays 110 of paper discharge unit 108.

Paper discharge unit 108 may perform a process of sorting a plurality of printed sheets of paper to be output to different discharge trays 110, a process of punching each sheet of recording paper or a process of stapling the sheets of recording paper. Assume that a number of copies of the printing are to be prepared. In that case, sheets of recording paper are sorted and discharged to paper discharge trays 110 such that each tray 110 contains each set of printed sheets, and the set of printed sheets in each tray 110 is stapled or punched.

—Facsimile Mode—

In the following, an operation in the facsimile mode will be described. In the facsimile mode, in the transmission operation, document reading unit (scanner unit) 102 and FAX communication unit 160 mainly operate, and in the reception operation, FAX communication unit 160 and image forming unit 104 mainly operate.

—Transmission Operation—

In image editing apparatus 100, the facsimile mode is designated. A document placed on the platen is read by document reading unit 102 as image data. The read image data is input to CPU 300 implemented, for example, by a microcomputer shown in FIG. 3, the image data is subjected to various image processing operations here, and the resulting image data is output to a FAX communication unit (FAX communication unit 160 of FIG. 3).

FAX communication unit 160 of image editing apparatus 100 on the transmitting side connects a designated transmitting side line to a designated transmission destination. After connection, FAX communication unit 160 converts the image data to communication data in compliance with facsimile transmission standard, and transmits the converted data to a facsimile machine (such as an image editing apparatus 100 having the facsimile function) on the receiving side.

—Communication Operation

When the line is connected, a FAX communication unit 160 of the image editing apparatus 100 on the receiving side detects a communication request signal from FAX communication unit 160 of image editing apparatus 100 on the transmitting side, and transmits an acknowledgement signal. Thereafter, by way of example, FAX communication units 160 on the transmitting and receiving sides pass performance information supported by transmitting side and receiving side, determine highest possible speed of communication and method of coding/code correction of image data, and set the method of communication of modems. Then, using the image signal format in compliance with the communication method, data is transmitted from FAX communication unit 160 of image editing apparatus 100 on the transmitting side to the FAX communication unit of image forming apparatus on the receiving side. When transmission ends, the line is disconnected.

—Reception Operation

FAX communication unit 160 of image editing apparatus 100 on the receiving side converts the received data to image data and passes the data to image forming unit 104. The received data may be converted to image data at the image forming unit 104. The image forming unit 104 prints an image of a document represented by the image data converted from the received data on a sheet of recording paper, in a manner similar to the operation in the copy mode described above.

—Other Image Transmission Mode—

Operations of the image editing apparatus in mail mode, i-FAX mode, shared folder mode, data input mode, FTP mode and desk top mode, as image transmission modes other than the facsimile mode, will be described. In these image transmission modes, mainly the document reading unit (scanner unit) 102, image forming unit 104 and network interface (I/F) 304 operate.

In image editing apparatus 100, a document placed on a platen is read by document reading unit 102 as image data. The read image data is input to CPU 300, and subjected to various image processing operations here. The image data is stored in a storage device (hard disk 302 as will be described later) provided in image editing apparatus 100. The image data is converted to a format (for example, TIFF-F format) usable for i-FAX. The converted data file is attached to an electronic mail. The electronic mail is transmitted to another image editing apparatus or to a computer through network interface 304 and the Internet.

The image editing apparatus receiving the i-FAX connects to a mail server at a predetermined time interval, and receives any mail addressed to it, stored in the mail server.

Different from the facsimile mode in which a telephone number of transmission destination is designated, a mail address of the transmission destination, an IP address, name of a server computer, a folder name or the like is designated in the image transmission modes other than the facsimile mode.

[Control Block Configuration]

Referring to FIG. 3, image editing apparatus 100 includes: an operation unit 120 capable of setting functions related to the copy mode, facsimile mode, document filing mode and mail mode; an ROM 306 for storing a program or programs; a hard disk (HDD) 302 as a non-volatile storage device capable of storing programs and data even when power is cut off; and an RAM (Random Access Memory) 308 providing a storage area when a program is executed.

Image editing apparatus 100 includes a bus 310, connected to document reading unit 102, image forming unit 104, FAX communication unit 160, operation unit 120, ROM 306, hard disk 302 and RAM 308; and a CPU 300 connected to bus 310, for executing a program realizing general functions of the image editing apparatus.

Hard disk 302 stores files of image data of documents scanned by image editing apparatus 100, folder by folder, together with date and time of saving and name of the user who saved. Hard disk 302 also stores initial screen image data of respective operational modes.

ROM 306 stores programs and data necessary for controlling operations of image editing apparatus 100. ROM 306 may store the initial screen image data of respective operational modes. CPU 300 executes control related to various functions of image editing apparatus 100 in accordance with the programs and data stored in ROM 306.

As shown in FIG. 3, a public line is connected for transmitting/receiving image data, to FAX communication unit 160 of image editing apparatus 100. To network interface 304, a network line is connected. To the network line, a computer using image editing apparatus 100 as a network-supported printer, other computer or other image editing apparatus may be connected. When the network line is connected to the Internet, image editing apparatus 100 may obtain necessary information and transmit/receive image data through the Internet.

RAM 308 provides a function of a working memory for temporarily storing results of operations and processes by CPU 300, and a function of a frame memory for storing image data.

CPU 300 controls document reading unit 102, image forming unit 104, touch-panel display 130 and display operation unit 140 forming operation unit 120, ROM 306, hard disk 302 and RAM 308 by executing a prescribed program or programs. Operation unit 120 communicates with CPU 300 through an input/output interface.

Operation unit 120 is formed of a plate-shaped panel provided in an inclined manner to be easily viewable by the user. On a surface of operation unit 120, touch panel display 130 is provided on the left side area, and display operation unit 140 (pilot lamp 142 and power key 144, energy-saving key 146 and home key 148 as hardware buttons) is provided on the right side area. Display 130 and display operation unit 140 form operation unit 120 as one integrated body as a whole.

As described above, touch-panel display 130 is formed of display panel 132 and touch-panel 134 arranged on display panel 132. On display panel 132 of touch-panel display 130, a home screen image allowing selection of an operational mode of image editing apparatus 100, current state of image editing apparatus 100, status of destination designation, and status of job processing are displayed. On a display area of display panel 132, selection buttons as software buttons are displayed. When a portion where the selection button is displayed is pressed, the pressed position is detected by touch-panel 134. By comparing the display position of the selection button and the position where touch-panel 134 is pressed using a program, selection of an operational mode, setting of a function, and instruction of an operation of image editing apparatus 100 become possible. In addition to such a touch operation (command input operation based on the position of pressing by the user), image editing apparatus 100 also allows gesture operation (command input operation based on trajectory of operation by the user).

Pilot lamp 142 of display operation unit 140 may include, for example, an LED (Light Emitting Diode). It is turned on/off (/flickered) under the control of CPU 300. When the user presses power key 144 provided separate from a main power switch, image editing apparatus 100 makes a transition from a standby mode (in which only the FAX receiving operation is possible with the main power on) to a normal mode, in which the user can use every operational mode of image editing apparatus 100. In this state, pilot lamp 142 is turned and kept on. If a predetermined time passes without any user operation, or if the user presses energy-saving key 146, image editing apparatus 100 makes a transition from the normal mode to the energy saving mode. In the energy saving mode, only some of the operational modes of image editing apparatus 100 can be used. In this state, pilot lamp 142 flickers. Further, if the user presses energy-saving key 146 in the energy saving mode, the image editing apparatus 100 makes a transition from the energy saving mode to the normal mode. Home key 148 is a hardware key for returning the display of touch-panel display 130 to the initial state (home screen image).

In a hardware button (power key 144, energy-saving key 146 and home key 148) of display operation unit 140, a key lamp or key lamps, which is/are turned on/off (/flickered) under the control of CPU 300, may be embedded. By way of example, the key lamps provide a light ring on the edge of a circular key, or the key lamp lights a central portion of the key. The key lamp is turned on at a timing when hardware buttons are allowed to be used as the operation device (at a timing when a process is executed if the hardware button is used).

[Image Edition Mode in Preview Display]

Figure 4:
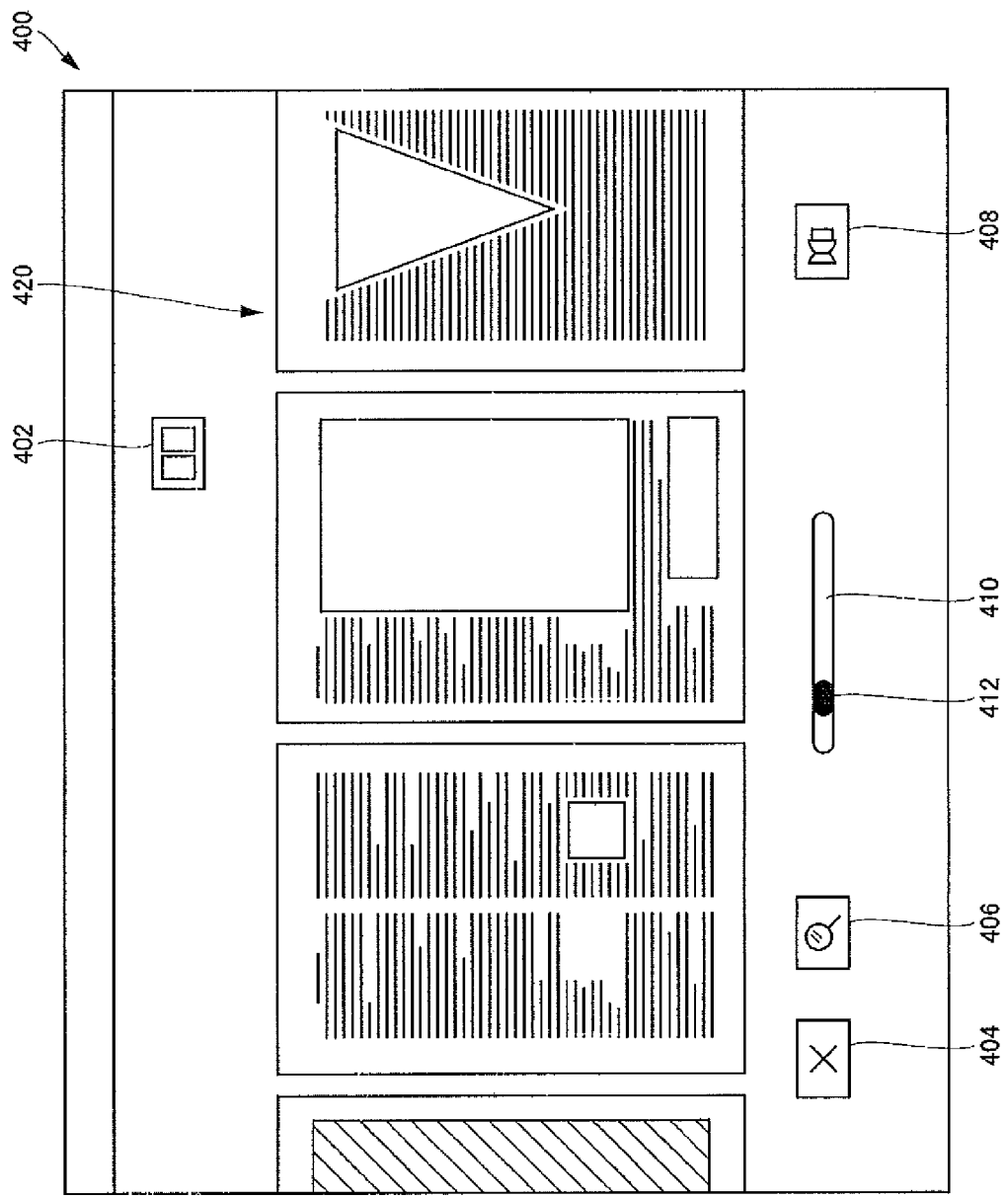
FIG. 4 shows a 1D fit screen image displayed on a touch-panel display.
Figure 5:
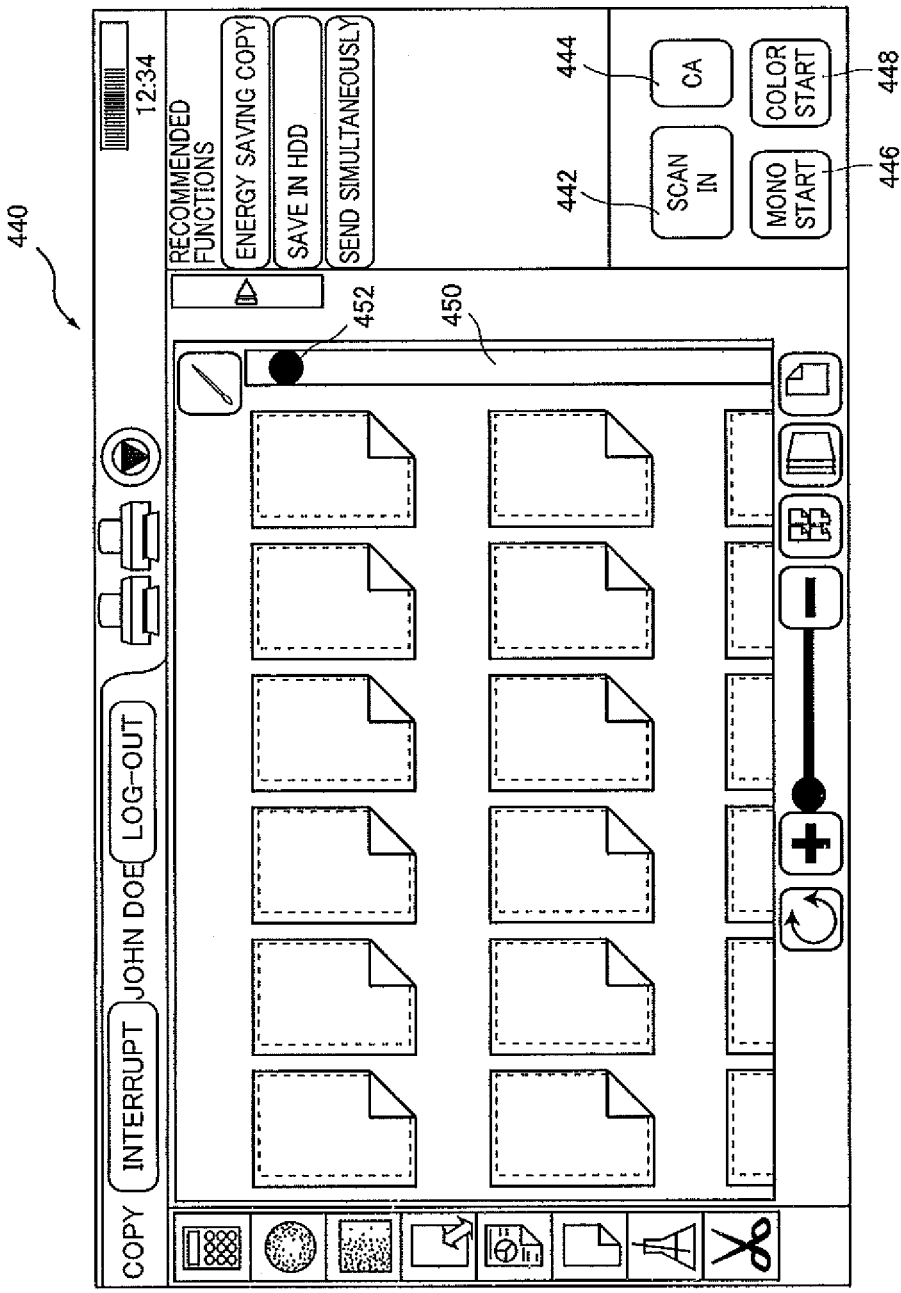
FIG. 5 shows a 2D screen image displayed on the touch-panel display.
Figure 6:
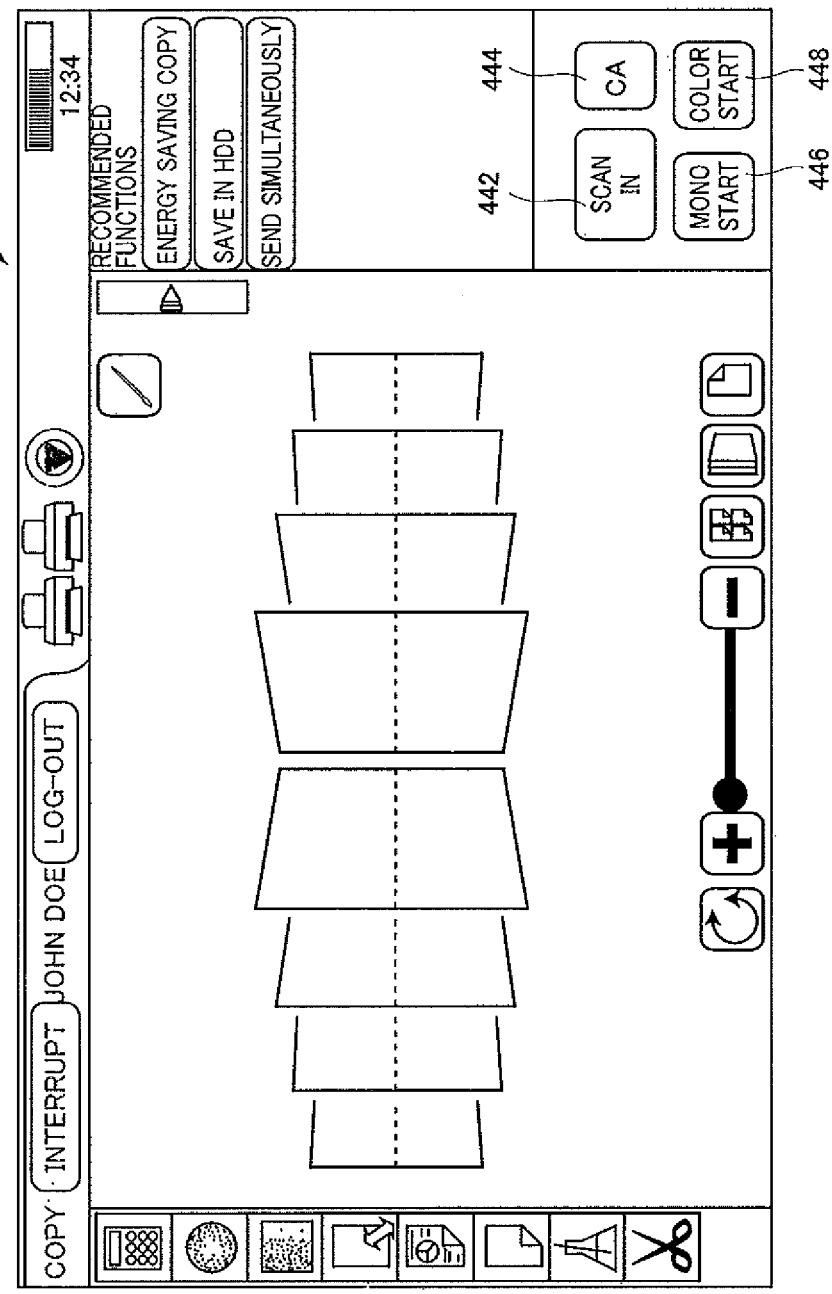
FIG. 6 shows a page flow screen image displayed on the touch panel display.

Image editing apparatus 100 has, as display modes for the preview display, three display modes: a 1D fit display (FIG. 4); a 2D display (FIG. 5); and a page flow display (FIG. 6). Referring to FIGS. 4 to 6, the display screen images for the respective display modes will be described.

Referring to FIGS. 4 to 6, on the lower right portion of these screen images, function keys related to reading and printing are displayed. The area on which these function keys are displayed is, in the present embodiment, referred to as a "task trigger area." On the task trigger area, the copy start key mentioned above, a scan start key, a cancel key and the like are displayed. In the present embodiment, the task trigger area is always displayed at the same position in any display mode, except for the 1D fit display. In the following description, in the figures related to the 1D fit display, the task trigger area is not shown for easier view of the figures.

Referring to FIGS. 4 to 6, when a document is set on a platen, not shown, and the user touches a scan start key 442, document reading unit 102 reads the document, and preview display of the image data of the document appears. When the user touches a monochrome print key 446 while the preview is displayed, monochrome printing of the image data starts. When the user touches a color print key 448, color printing of the image data starts. If the user touches a cancel key 444 during execution of reading and printing, the process being executed is stopped.

By the preview image, the user can confirm how the image data will be output. Particularly, the 1D fit screen image shown in FIG. 4 allows page-by-page edition of image data including deletion, moving and copying.

Referring to FIG. 4, on 1D fit screen image 400, various function keys are displayed, in addition to the preview display 420 of image data. The user can edit, page by page, the image data of which preview display is given, using these function keys. If the user touches an all-select/clear key 402, all pages of the preview display screen image of displayed image data are selected. If selection of all pages is to be cancelled, the user may again touch all-select/clear key 402. By drag-and-dropping a page image of a page to be deleted to a page delete key 404, the user can delete the page. The user can also delete the page by selecting a page image to be deleted and further by touching page delete key 404. By touching a magnification change key 406, the user can change the display magnification of preview display 420. By operating a scroll button 412 in a scroll bar 410, the user can scroll the page image. When the user flicks preview display 420, preview display 420 is scrolled in the direction, amount and velocity of scrolling corresponding to the direction, trajectory and speed of the flick. From the position of scroll button 412 in scroll bar 410, the user can grasp around which portion of the image data as a whole the preview display 420 is displaying. When the user touches display mode switching key 408, the display screen image is changed to the 2D screen image shown in FIG. 5 or to the page flow screen image shown in FIG. 6. Thus, the user can quickly switch the display screen image by display mode switching key 408.

Referring to FIG. 5, on 2D screen image 440, pages of image data are arranged in a matrix. By the preview display of respective pages, the user can confirm the overall arrangement of pages. By operating a scroll button 452 in scroll bar 450, the user can scroll the preview image. Since the 2D screen image is for confirming the finish of image data, edition of image data is impossible.

Referring to FIG. 6, on page flow screen image 460, a preview display showing the image data in three-dimensional manner is displayed. The preview display displays the output document reflecting the state of actual print. When double-sided printing is being done, the page images are preview-displayed with images also formed on the rear pages, and when collective printing such as 2-in-1 or 4-in-1 is being done, the page images are preview-displayed in the collected manner. Thus, the user can confirm specific manner of finish of the output document. By flicking the preview display, the user can change the page image displayed at the central portion to another page image. Since the page flow screen image is for confirming the finish of image data, edition of image data is impossible.

[Edition of Image Data]

Figure 7:
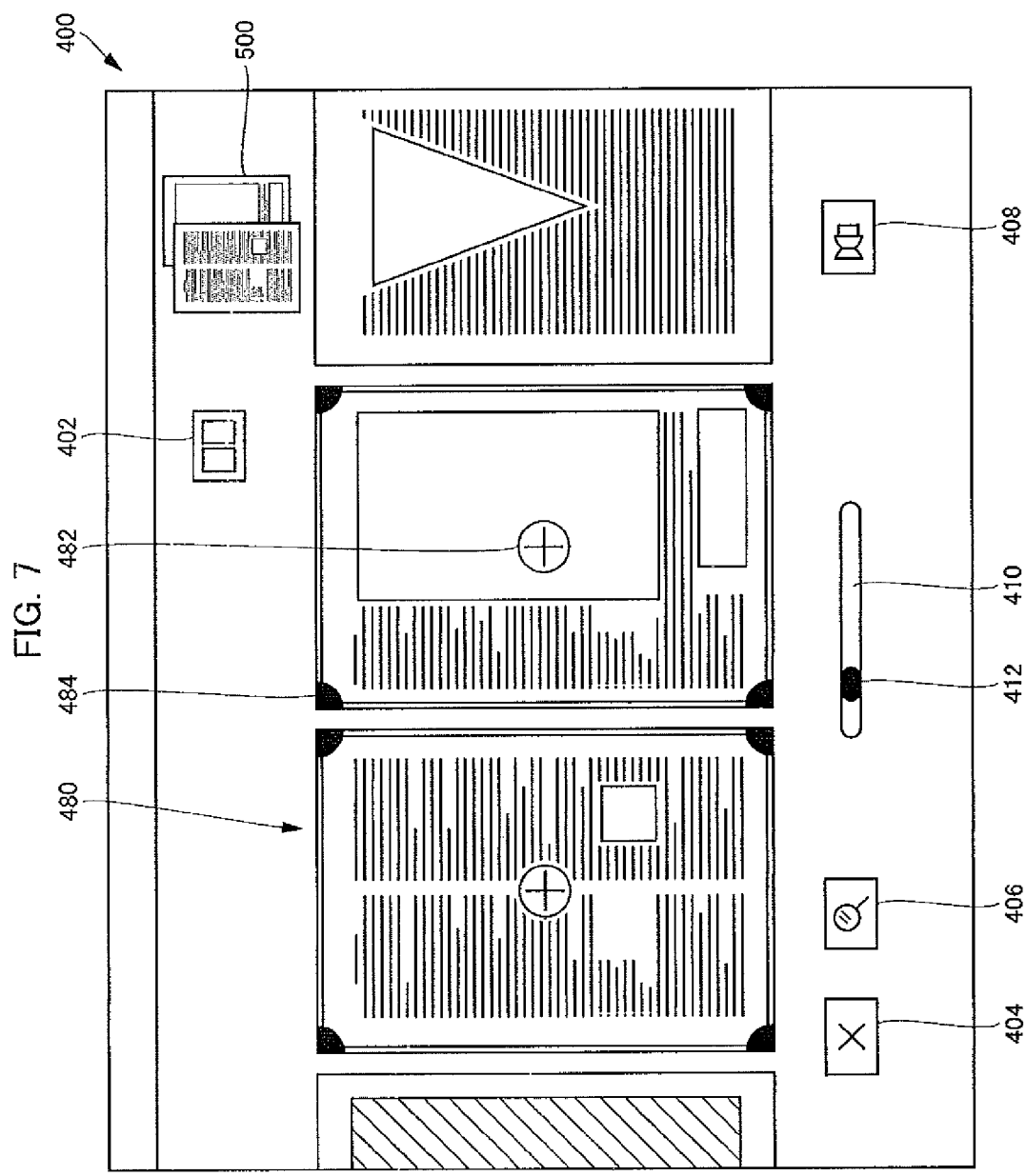
FIG. 7 shows a display given when a page image is selected on the preview display of FIG. 4.

Referring to FIGS. 4 and 7 to 10, edition of image data in the edition mode will be described. Referring to FIG. 4, selection of a page image can be realized by touching preview display 420 or all-select/clear key 402. If all page images are to be selected, the user touches all-select/clear key 402. If a part of page images is to be selected, the user touches preview display 420 of the desired page image. Referring to FIG. 7, when a page image is selected, the selected page image is changed to a selection emphasized image 480. In selection emphasized image 480, each page image is surrounded by a frame, and an emphasizing mark 482 for edition is displayed at the center. By dragging the emphasizing mark 482, the page can be moved. At four corners of selection emphasized image 480, emphasizing handles are displayed, and the user can rotate the page image using emphasizing handles 484. By pressing with a finger a portion other than emphasizing handles 484, the selected page can be dragged. Further, in the present embodiment, when a page image is selected, in response, a reduced image 500 of the selected page image is displayed at a fixed area at the upper right portion of the screen image. When a plurality of page images are selected, reduced images 500 of the plurality of pages are displayed. The page images of reduced images 500 are arranged in ascending order starting from the smaller page number. If a large number of pages are selected, only the images of few pages are displayed as reduced images 500 and remaining pages are displayed collectively like shadows.

Figure 8:
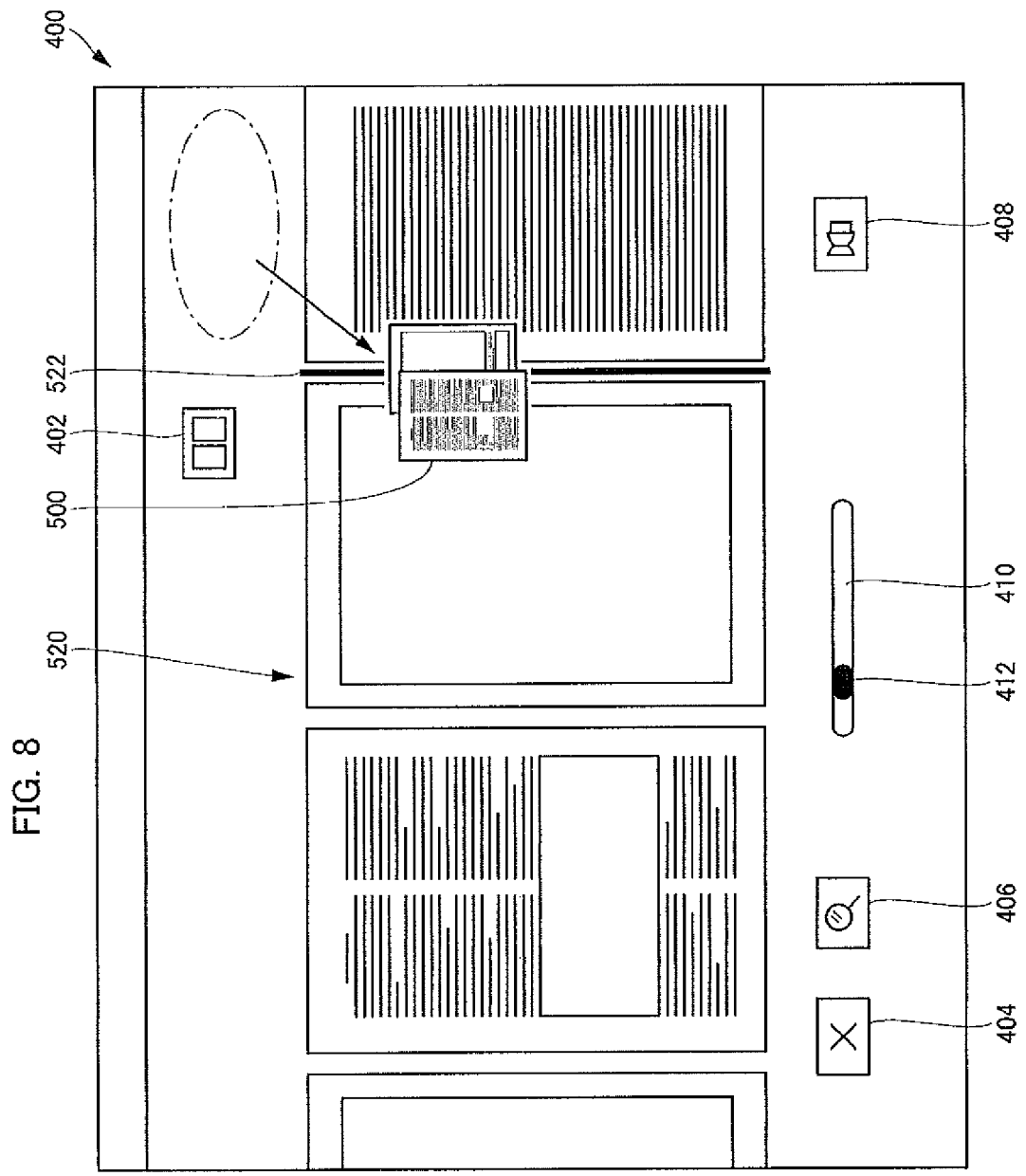
FIG. 8 shows a display when a reduced image of the page image is dragged.

Referring to FIG. 8, if scroll button 412 in scroll bar 410 is dragged or flicked with reduced image or images 500 being displayed, the preview display of page images can be scrolled. By touching a portion other than scroll button 412 in scroll bar 410 also, the preview display can be scrolled until the page corresponding to the touched portion is displayed. The position where reduced image or images 500 are displayed is fixed, and it is unchanged even if the preview display is scrolled.

Figure 9:
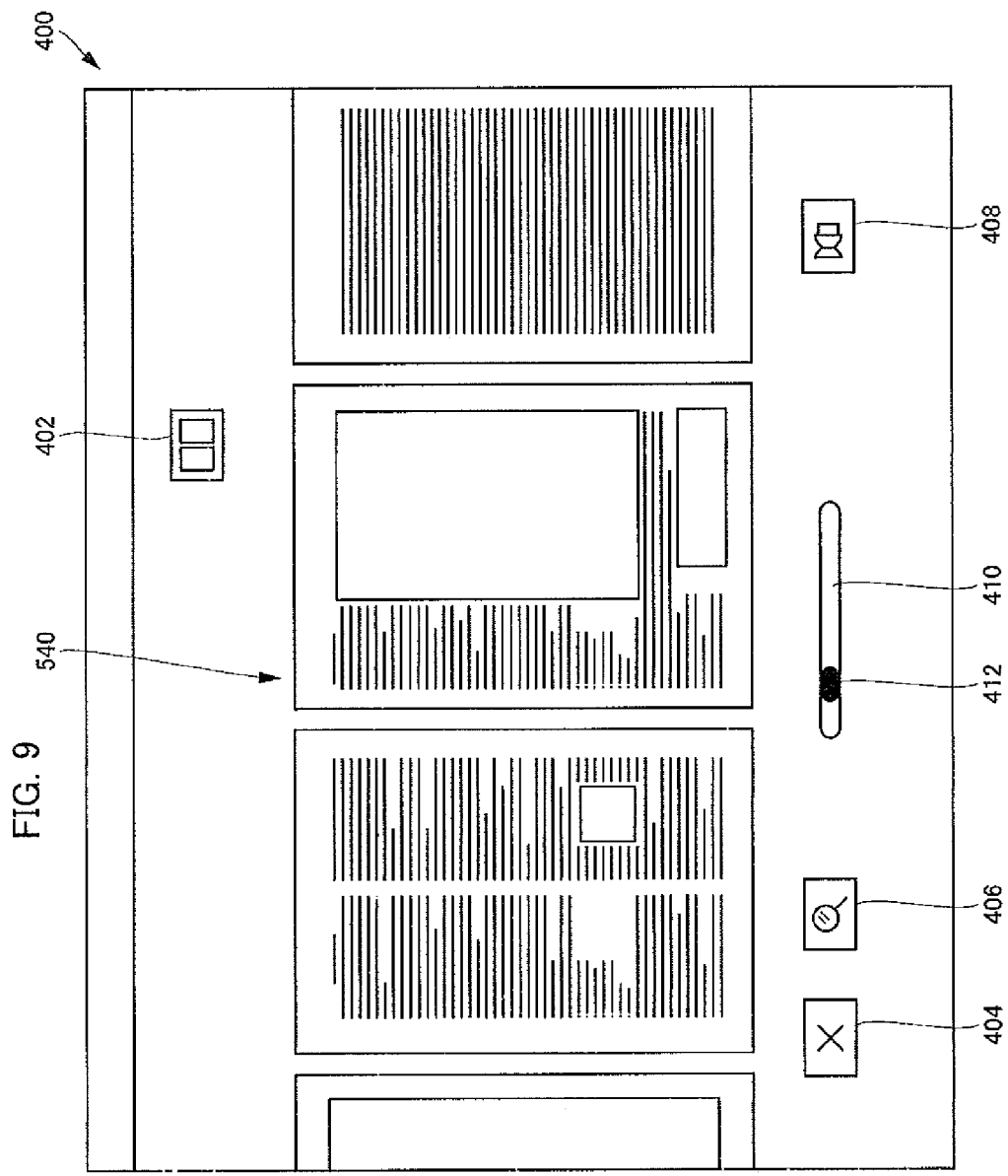
FIG. 9 shows the preview display after the reduced display of page image is drag-and-dropped.

After the preview display is moved to the desired position in this manner, by drag-and-dropping reduced image or images 500 to a desired position of movement, the position of the selected page or pages can be changed (moved). At this time, when reduced image or images 500 are dragged to a space between two page images, an emphasizing display 522 indicating that a page image or images can be inserted between these page images is displayed. If reduced image or images 500 are dropped on emphasizing display 522, the selected page image or images are inserted between the preceding and succeeding page images, as shown in FIG. 9. In the present embodiment, the selected page image or images are moved from the original position to this position. When the inserting operation ends, display of reduced image or images 500 disappears. Specifically, selection of the drag-and-dropped image or images is canceled.

Further, the position of a page image can also be changed by directly drag-and-dropping a page image in the preview display. Referring to FIG. 7, by selecting and dragging a page image to be moved, an image 480 of the page is displayed semi-transparently over the preview display. If a position as a destination of movement is not displayed, image 480 is drawn to the left or right end of the screen image, so that the preview display is scrolled. By dropping image 480 at a desired portion (a portion that allows insertion as indicated by emphasizing display 522), the selected image is inserted to that position as shown in FIG. 9.

Selection and cancellation of selection of a page image are generally realized by touching and re-touching the page image, and also possible by operating all-select/clear key 402 (see FIG. 4). If all-select/clear key 402 is pressed while there is an unselected page image, all page images, including a page image or images that have already been selected, are selected. When all-select/clear key 402 is touched again, selection of all pages is cancelled.

[Software Configuration]

Mainly referring to FIGS. 11 to 14, a control structure of a program executed by CPU 300 for realizing the preview display and page image movement using reduced image 500 as described above will be described. CPU 300 executes, in parallel with such a program, programs for realizing general functions of an image editing apparatus. These programs, however, are not directly related to the essential portion of the present invention and, therefore, details thereof will not be described here.

Figure 11:
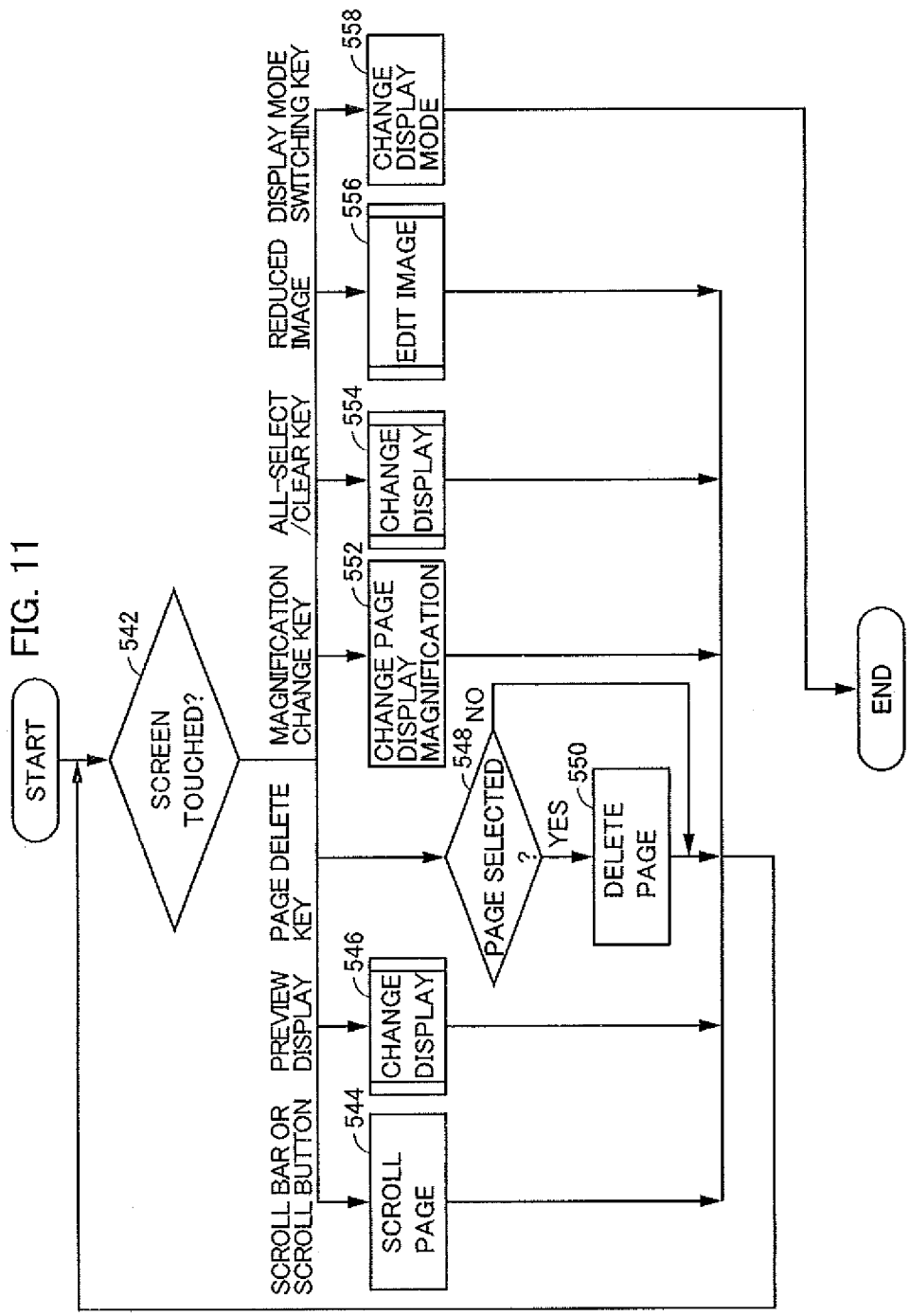
FIG. 11 is a flowchart representing a control structure of a program for executing processes in accordance with touched positions.

Referring to FIGS. 4 and 11, when the program is executed, CPU 300 determines which portion of the screen image is touched (step 542). Depending on the result of determination, the next process step is determined.

If scroll bar 410 and scroll button 412 are operated, CPU 300 scrolls preview display 420 (step 544). After the end of step 544, the control returns to step 542.

If preview display 420 is touched, CPU 300 changes the display on the screen image (step 546). Details of step 546 will be described later. After the end of step 546, the control returns to step 542.

If page delete key 404 is touched, CPU 300 determines whether or not a page image has been selected (step 548). If the determination is positive, CPU 300 deletes the selected page (step 550), and the control returns to step 542. If the determination at step 548 is negative, the control returns to step 542.

If magnification change key 406 is touched, CPU 300 changes the display magnification of preview display 420 (step 552). As the magnification is changed, preview display 420 is enlarged or reduced. After the end of step 552, the control returns to step 542.

If all-select/clear key 402 is touched, CPU 300 changes the display on the screen image (step 554). Details of step 554 will be described later. After the end of step 554, the control returns to step 542.

If reduced image 500 shown in FIG. 7 is touched, CPU 300 executes image edition using the reduced image (step 556). Details of step 556 will be described later. After the end of step 556, the control returns to step 542.

If display mode switching key 408 is touched, the display mode is switched, and the 1D fit screen image shown in FIG. 4 is changed to the 2D screen image shown in FIG. 5 or to the page flow screen image shown in FIG. 6 (step 558). Thereafter, the control is passed to the screen image program of the switched-in screen image and, when step 558 ends, the control of the program ends.

Figure 12:
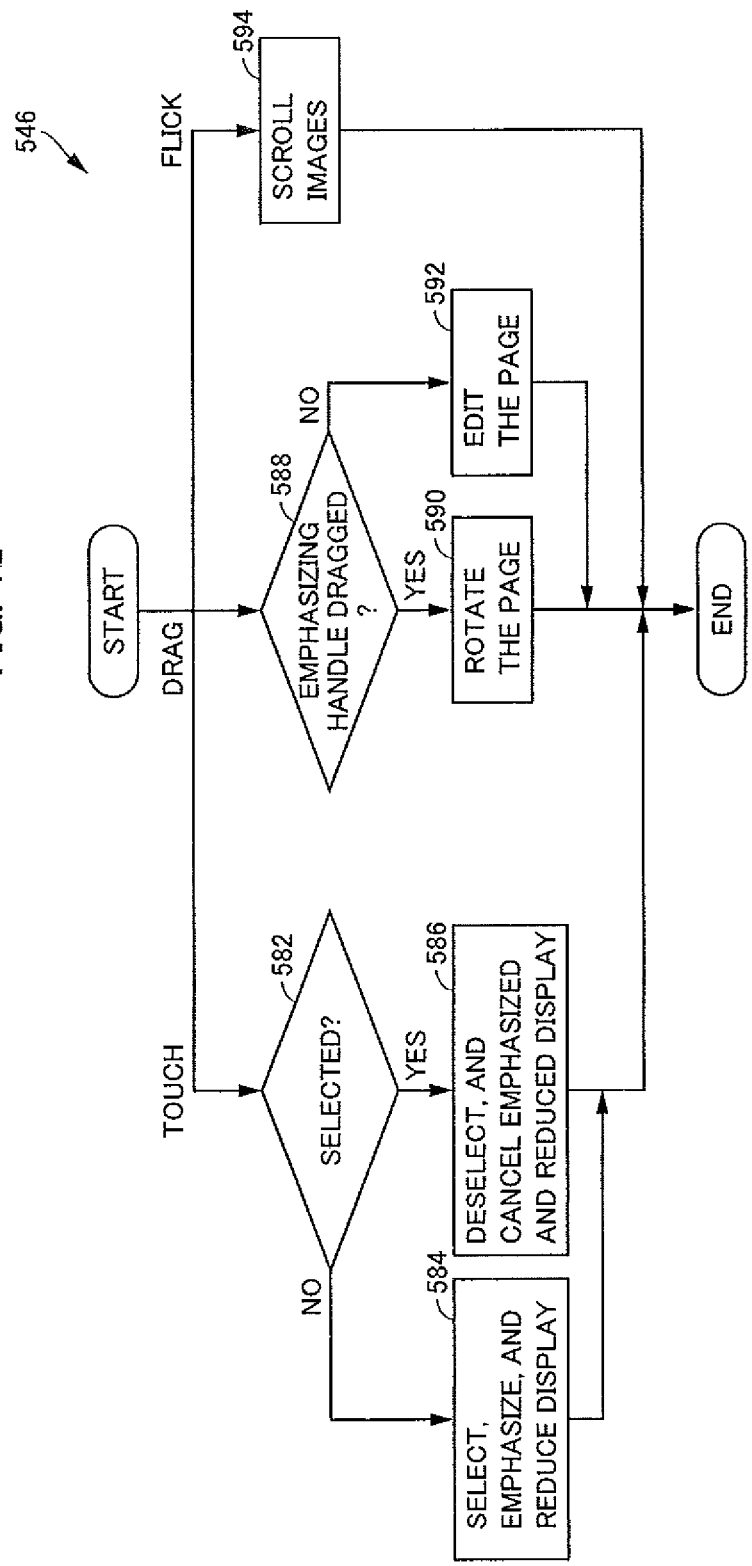
FIG. 12 is a flowchart representing a control structure of a program executing a process in response to an operation on the preview display.

Referring to FIGS. 4, 7 and 12, the control at step 546 of FIG. 11 will be described. The process differs depending on what operation has been made on the preview display. If the preview display is touched, CPU 300 determines whether or not the image of the touched preview display has already been selected (step 582). If the determination is positive, CPU 300 sets the page to unselected state, and cancels the display of selection emphasized image 480 and reduced image 500 (step 586). If the determination at step 582 is negative, CPU 300 sets the touched image as an object of selection, and displays the selection emphasized image and the reduced image of the page image (step 584). After the end of step 584 or 586, the control returns to step 542 of FIG. 11.

If a page image of preview display is dragged, CPU 300 determines Whether or not the dragged portion is emphasizing handle 484 (step 588). If the determination is positive, CPU 300 rotates the page in accordance with the dragging operation (step 590. If the determination at step 588 is negative, CPU 300 edits the page (step 592). Specifically, if the image is drag-and-dropped on page delete key 404, the page is deleted. If the image is drag-and-dropped to any position on the page images of preview display, CPU 300 moves and inserts the selected image to the dragged position. After the end of steps 590 and 592, the control returns to step 542 of the main routine.

If the preview image is flicked, CPU 300 scrolls the preview display in accordance with the speed and length of trajectory of the flick (step 594). After the end of step 594, the control returns to step 542 of the main routine.

Figure 13:
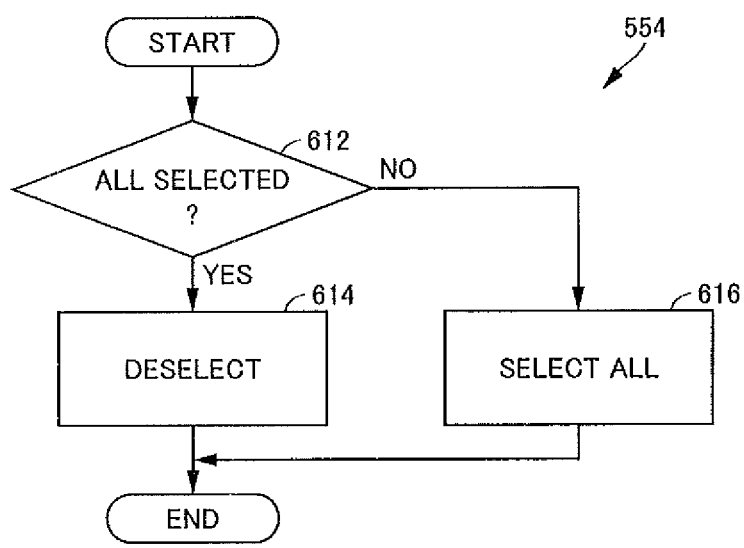
FIG. 13 is a flowchart representing a control structure of a program executing a process in response to an operation of all-select/clear key.

Referring to FIGS. 4, 7 and 13, the control up to step 554 of FIG. 11 will be described. If all-select/clear key 402 is touched, CPU 300 determines whether or not the page images have already been all selected (step 612). If the determination is positive, the control proceeds to step 614, at which CPU 300 cancels selection of all pages (step 614). Specifically, all pages are set to unselected state, and display of selection emphasized image 480 and reduced image 500 shown in FIG. 7 is cancelled. If the determination at step 612 is negative, the control proceeds to step 616, at which CPU 300 selects all pages (step 616). Specifically, all pages are selected and displayed in emphasized manner, and reduced images 500 are displayed. After the end of steps 614 and 616, the control returns to step 542 of the main routine.

Figure 14:
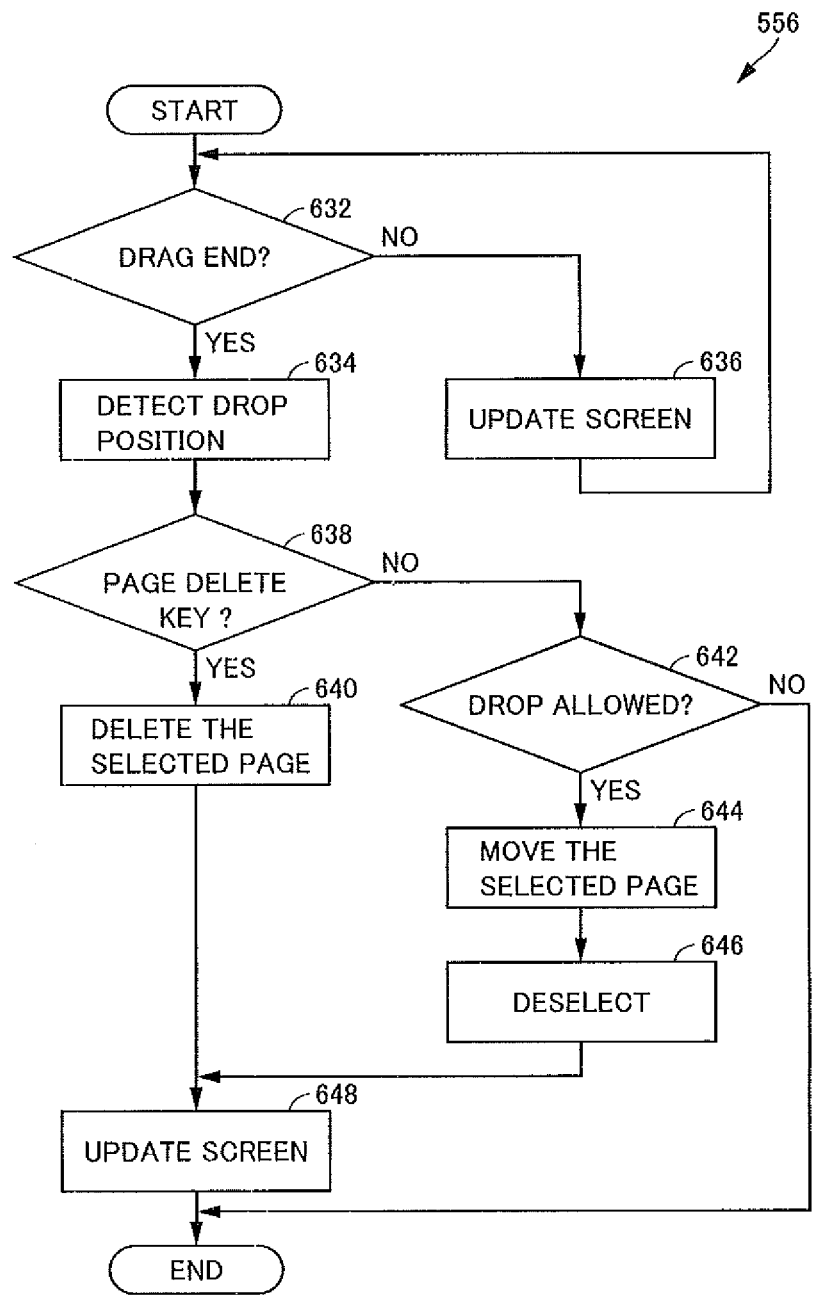
FIG. 14 is a flowchart representing a control structure of a program executing a process in response to an operation on the reduced image.

Referring to FIGS. 7 and 14, if reduced image 500 is dragged, CPU 300 determines whether or not dragging has been completed (step 632). If the determination is positive, the control proceeds to step 634, at which CPU 300 detects the position where reduced image 500 has been dropped. If the determination at step 632 is negative, control proceeds to step 636, at which CPU 300 updates the screen image as the dragging continues. Specifically, reduced image 500 is moved to a position that corresponds to the dragging use's finger. At this time, reduced image 500 is displayed semi-transparent, so that the contents of preview display given in overlapped manner can be confirmed. If reduced image 500 is dragged between page images of the preview display, CPU 300 displays the emphasizing display 522 shown in FIG. 8 between the pages. If reduced image 500 is dragged to an end portion of the screen image, CPU 300 scrolls the preview display in a direction opposite to the dragging of the reduced image. Specifically, by dragging reduced image 500, the user can scroll the preview display. After the end of step 636, the control returns to step 632.

At step 638, CPU 300 determines whether or not the position detected at step 634 is the position of page delete key 404. If the determination is positive, CPU 300 deletes the image data of the dragged page image (step 640), updates the display in accordance with the result (step 648), and ends the process. If the determination at step 638 is negative, the control proceeds to step 642. At step 642, CPU 300 determines whether or not dropping at that position is possible. If the determination is positive, the control proceeds to step 644, and if it is negative, the control returns to step 542 of the main routine. At step 644, CPU 300 moves and inserts the dragged page image to the drop position. At step 646, CPU 300 cancels selection of the page. Specifically, the page or pages are set to unselected state, the emphasized display is returned to normal display, and the reduced display is deleted. At step 648, CPU 300 updates the preview display in accordance with an immediately preceding operation, and the control returns to step 542 of the main routine.

[Operation]

If image edition is done using the preview display, image editing apparatus 100 operates in the following manner. In the following description, FIGS. 11 to 14 are mainly referred to.

When a document placed on a platen is read by document reacting unit 102 as image data, the image data is once stored in hard disk 302. From the image data, images for preview display are created. Using the images for preview display, a preview display of read image data is displayed on touch-panel display 130. It is possible for the user to switch the display mode using display mode switching key 408. If display mode switching key 408 is touched, image editing apparatus 100 changes the display screen image to 1D fit screen image 400 shown in FIG. 4, 2D screen image 440 shown in FIG. 5 or to page flow screen image 460 shown in FIG. 6.

On 1D fit screen image 400 as the display screen image in the edition mode, various function keys related to edition are displayed. Image editing apparatus 100 edits the image data in accordance with how the function keys are operated. Here, the operation of image editing apparatus 100 when the editing operation is done using the preview image and the reduced image will be described.

Referring to FIG. 12, preview display 420 shown in FIG. 4 is touched, and if the touched image has not been selected, image editing apparatus 100 selects the image (step 584). Specifically, the touched image is set as an object of selection, and the image is changed to selection emphasized image 480 shown in FIG. 7. At an upper right portion of the display screen image, reduced image 500 of the image is displayed. If the touched image has already been selected, image editing apparatus 100 cancels selection of the image (step 586). Specifically, the touched image is set to unselected state, the selection emphasized image 480 is returned to the original preview display, and display of reduced image 500 is cancelled.

In this manner, since the selected page image is displayed as an emphasized image and reduced image, the user can easily confirm which image is selected, even if the preview display is scrolled. Therefore, he/she can confirm which page is the selected page while doing other operations and, therefore, efficient editing operation becomes possible. If the number of images is large, or if the selected images are discontinuous, display of emphasized images and reduced images are particularly helpful.

If emphasizing handle 484 is dragged, image editing apparatus 100 rotates the page image in accordance with the dragged position (step 590). If a portion other than emphasizing handle 484 on the page image is dragged, image editing apparatus 100 edits the dragged page image (step 592). Specifically, if the image is drag-and-dropped on page delete key 404, image editing apparatus 100 deletes the page. If the image is drag-and-dropped at any position on the page image of preview display, image editing apparatus 100 inserts the image to the dragged portion.

If the preview display is flicked, image editing apparatus 100 scrolls the preview display in accordance with the speed and length of trajectory of the flick (step 594).

Referring to FIG. 14, if reduced image 500 is dragged, image editing apparatus 100 updates the display of screen image in accordance with the dragging movement (step 636). Specifically, image editing apparatus 100 moves reduced image 500 to the dragged position and displays it semi-transparently. If reduced image 500 is dragged between pages of the preview display, image editing apparatus 100 displays the emphasizing display 522 between the pages. If reduced image 500 is dropped on emphasizing display 522, image editing apparatus 100 moves the dragged page to the dropping position (step 644), and cancels selection of the page image (step 646). If reduced image 500 is dragged to an end portion of the screen image, image editing apparatus 100 scrolls the preview display in a direction opposite to the dragging direction.

As described above, when image edition takes place, the editing operation is reflected on all selected images. Therefore, it is possible for the user to collectively edit a plurality of pages. When there are a plurality of pages to be edited, it is possible to collectively edit these pages by selecting all these pages in advance. If the image is dragged between pages between which insertion is possible, emphasizing display 522 appears between the pages. Therefore, the user can easily confirm where the dragged image is to be inserted, If all-select/clear key 402 is touched where all images have already been selected, image editing apparatus 100 cancels selection (step 614). Specifically, all pages are set to unselected state, and display of selection emphasized image 480 and reduced image 500 shown in FIG. 7 are canceled. If there is any image that is not selected, image editing apparatus 100 selects all pages (step 616). Specifically, all pages are the object of selection, these images are emphasized and reduced images are displayed.

In this manner, by pressing the all-select/clear key, the user can easily select and cancel selection of pages. If it is desired to once reset image selection, it is possible for the user to cancel selection without scrolling the preview display until the selected image or images appear.

Though reduced images 500 shown in FIG. 7 show continuous page images, as the reduced images in accordance with the present embodiment, discontinuous page images can also be displayed. If discontinuous page images are to be displayed, page images as reduced images 500 are arranged in the order of pages, as in the case of displaying continuous page images. The earliest page image is displayed on the front-most side of reduced images 500. If a large number of pages are selected, only a few earlier pages are displayed.

Figure 10:
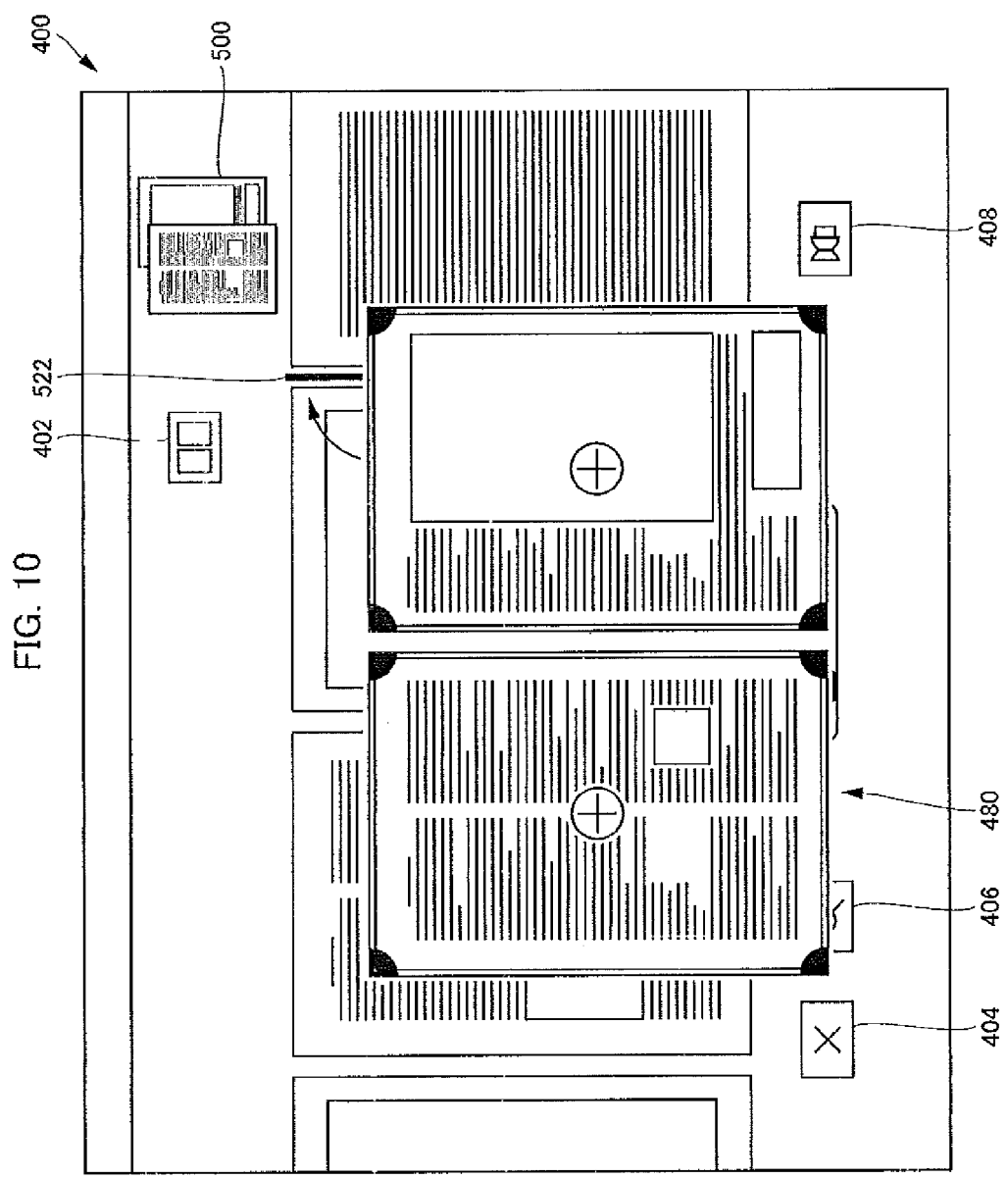
FIG. 10 shows a preview display when the preview display is drag-and-dropped.

Though the selection emphasized image 480 shown in FIG. 10 is displayed to have the same size as the preview display, the size may be different from the preview display. By way of example, if it is displayed in a size smaller than the preview display and larger than the reduced image, a portion overlapped with the preview display becomes smaller than when it is displayed in the same size as the preview display. Therefore, it becomes easier for the user to confirm the preview display.

In the present embodiment, since the preview image is smaller than the preview display, it can be displayed on a small display panel. Therefore, the present invention is applicable to various image editing apparatuses including display panels. For example, in addition to multifunction peripherals, application to printers, facsimile machines, digital cameras and smart phones may be possible. It is needless to say that the present invention is applicable to an image editing apparatus having a display panel larger than the display panel of common multifunction peripherals.

As described above, according to the image editing apparatus in accordance with the present embodiment, if a page image in a preview display is selected, a reduced image thereof is displayed at a fixed position on the screen image. Even if a plurality of pages are selected, reduced images thereof are displayed at the same position. By drag-and-dropping the reduced image or images to a desired position, the selected image or images can be edited, for example, deleted or moved. Since the reduced image is kept displayed even if the page images are scrolled, it is possible to scroll at high speed and to move easily even if the page images are to be moved to a distant position. Since flicking can be used for scrolling, quick scrolling operation is possible. As compared with a conventional technique of scrolling the preview display while dragging the page image to be moved, movement of the page image becomes easier, quicker and more reliable.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An image editing apparatus, comprising:
   a display device having a display screen;
   a storage configured to store image data of a plurality of pages;
   a preview display device configured to display preview images of the image data stored in said storage in a scrollable manner on said display screen;
   a page selecting device configured to select any page of said image data in response to a user operation selecting said any page;
   a selected page display device, configured to display an image representing a page or pages selected by said page selecting device in a specific area on said display screen, separate from the preview image displayed by said preview display device and independent from scrolling by said preview display device; and
   an editing device configured to edit page order of said image data in response to a user operation on the image displayed by said selected page display device; wherein
   said image displayed by said selected page display device is the image of the selected page or pages selected by said page selecting device, and each of the page or pages in said image displayed by said selected page display device being smaller than any of the preview images of the page displayed by said preview display device, and when a plurality of page images are selected, said image is an image of the pages arranged as a set in ascending order starting from a smaller page number; and
   said editing device includes a moving apparatus configured to move, in response to a user operation of dragging said image displayed by said selected page display device in said specific area to an area where an arrangement of preview images is displayed by said preview display device, a page corresponding to the image in said image data, and further configured to erase said image when the movement is completed,
   said image editing apparatus further comprising:
   a selection cancelling device configured to cancel selection of any of the selected page or pages selected by said page selecting device, in response to a user operation to cancel selection of said any of the selected page or pages; and
   an erasing device configured to erase, in response to cancellation by said selection cancelling device, that image in the image displayed by said selected page display device which corresponds to the page of which selection is cancelled by said selection cancelling device.

2. The image editing apparatus according to claim 1, wherein said page display device displays said image on an area different from an area where said preview image is displayed, of said display screen.

3. The image editing apparatus according to claim 1, wherein said preview display device further displays a button instructing deletion of said image data on said display screen; said editing apparatus further comprising
a deleting device, configured to delete, in response to a user operation of drag-and-dropping said image displayed by said selected page display device to said button displayed by said preview display device, a page corresponding to the image from said image data.

4. The image editing apparatus according to claim 3, further comprising
an inserting device, configured to move and insert, in response to a user operation of selecting said preview image displayed by said preview display device and drag-and-dropping the preview image on said display screen, said page selected and drag-and-dropped by the user to a position corresponding to said drag-and-dropped position in the arrangement of said image data of a plurality of pages.

5. The image editing apparatus according to claim 1, further comprising
an inserting device, configured to move and insert, in response to a user operation of selecting said preview image displayed by said preview display device and drag-and-dropping the preview image on said display screen, said page selected and drag-and-dropped by the user to a position corresponding to said drag-and-dropped position in the arrangement of said image data of a plurality of pages.

6. The image editing apparatus according to claim 1, wherein said selected page display device additionally displays, every time a preview image displayed by said preview display device is selected by said page selecting device, an image representing the page selected by said page selecting device separate from said preview image and independent from scrolling by said preview display device, on said display screen.

7. An image editing method for editing image data on an image editing apparatus which includes a display device having a display screen, a storage configured to store image data of a plurality of pages, and a preview display device configured to display preview images of the image data stored in said storage in a scrollable manner on said display screen, the image editing method, comprising the steps of:
selecting, in response to a user operation selecting any page, the any page of said image data;
displaying, in response to selection of a page or pages at said selecting step, an image representing the page or pages selected at said selecting step, separate from the preview image displayed by said preview display device and independent from scrolling by said preview display device, in a specific area on said display screen; and
editing, in response to a user operation on the image displayed on said display screen, order of pages of said image data; wherein
said image displayed by the step of displaying is the image of the selected page or pages selected at said selecting step, and each of the page or pages in the image displayed by the step of displaying being smaller than any of the preview images of the page displayed by said preview display device, and when a plurality of page images are selected, said image is an image of the pages arranged as a set in ascending order starting from a smaller page number; and
said step of editing includes the step of moving, in response to a user operation of dragging said image displayed in a specific area on said display screen to an area where an arrangement of preview images is displayed by said preview display device, a page corresponding to the image in said image data, and erasing said image when the movement is completed,
said image editing apparatus further comprising:
a selection cancelling device configured to cancel selection of any of the selected page or pages selected at said selecting step, in response to a user operation to cancel selection of any of the selected page or pages; and
an erasing device configured to erase, in response to cancellation by said selection cancelling device, that image in the image displayed at said displaying step which corresponds to the page of which selection is cancelled by said selection cancelling device.

8. The image editing method according to claim 7, wherein said step of displaying includes the step of displaying said image on an area different from an area where said preview image is displayed, on said display screen.

9. The image editing method according to claim 7, further comprising the step of moving and inserting, in response to a user operation of selecting said preview image displayed by said preview display device and drag-and-dropping the preview image on said display screen, said page selected and drag-and-dropped by the user to a position corresponding to the drag-and-dropped position in the arrangement of said image data of a plurality of pages.

10. The image editing method according to claim 7, wherein at said step of displaying, every time a preview image displayed by said preview display device is selected at said selecting step, an image representing the page selected at said selecting step is additionally displayed separate from said preview image and independent from scrolling by said preview display device, on said display screen.

11. A non-transitory, computer readable recording medium recording a computer program for operating a computer connected to a display device having a display screen and to a storage configured to store image data of a plurality of pages, said program causing, when executed by the computer, the computer to execute an image editing method including the steps of
displaying a preview image of image data stored in said storage on said display screen;
scrolling, in response to a prescribed scrolling instruction by a user on the preview image displayed on said display screen, said preview image in a direction designated by said scroll instruction;
selecting, in response to a user operation selecting any page, the any page of said image data;
displaying, in response to selection of a page or pages at said selecting step, an image representing the page or pages selected at said selecting step, separate from the preview image displayed at said step of displaying a preview image, in a specific area on said display screen; and
editing order of pages of said image data, in response to a user operation on the images displayed on said display screen; wherein
said scrolling step includes the step of scrolling, in response to a prescribed scroll instruction by the user on the preview image displayed on said display screen, said preview image in a direction designated by said scroll instruction, without changing display position of the image representing said selected page
said image displayed by the step of displaying the image representing the selected page or pages selected is the image of the selected page or pages selected at said selecting step, and each of the page or pages in the image displayed by the step of displaying being smaller than any of the preview images of the page displayed by said preview display device, and when a plurality of page images are selected, said image is an image of the pages arranged as a set in ascending order starting from a smaller page number; and said step of editing includes the step of moving, in response to a user operation of dragging said image representing the page selected from said specific area to an area where an arrangement of preview images is displayed, a page corresponding to the image in said image data, and erasing said image when the movement is completed said image editing apparatus further comprising:

a selection cancelling device configured to cancel selection of any of the selected page or pages selected at said selecting step, in response to a user operation to cancel selection of any of the selected page or pages; and an erasing device configured to erase, in response to cancellation by said selection cancelling device, that image in the image displayed at said displaying step which corresponds to the page of which selection is cancelled by said selection cancelling device.

\* \* \* \* \*